United States Patent
Pultz, Jr. et al.

(10) Patent No.: US 7,341,702 B2
(45) Date of Patent: Mar. 11, 2008

(54) PROCESS FOR PRODUCING BORON NITRIDE

(75) Inventors: Donald William Pultz, Jr., Parma, OH (US); Laurence Maniccia, Lyndhurst, OH (US); Chandrashekar Raman, North Royalton, OH (US); Anand Murugaiah, North Olmsted, OH (US)

(73) Assignee: Momentive Performance Materials Inc., Wilton, CT (US)

( * ) Notice: Subject to any disclaimer, the term of this patent is extended or adjusted under 35 U.S.C. 154(b) by 20 days.

(21) Appl. No.: 11/266,157

(22) Filed: Nov. 3, 2005

(65) Prior Publication Data

US 2006/0140838 A1 Jun. 29, 2006

Related U.S. Application Data

(60) Provisional application No. 60/639,714, filed on Dec. 28, 2004.

(51) Int. Cl.
*C01B 21/064* (2006.01)
(52) U.S. Cl. .................................................. 423/290
(58) Field of Classification Search ................. 423/290
See application file for complete search history.

(56) References Cited

U.S. PATENT DOCUMENTS

| | | | |
|---|---|---|---|
| 2,922,699 A | 1/1960 | Lauzau | |
| 3,189,412 A | 6/1965 | Wood et al. | 423/390 |
| 3,241,918 A | 3/1966 | Lenihan et al. | |
| 3,261,667 A | 7/1966 | O'Connor | |
| 3,415,625 A | 12/1968 | Babl et al. | |
| 4,107,276 A | 8/1978 | Schwetz et al. | |
| 4,971,779 A * | 11/1990 | Paine et al. | 423/290 |
| 5,854,155 A * | 12/1998 | Kawasaki et al. | 501/96.4 |
| 6,319,602 B1 | 11/2001 | Fauzi et al. | 428/366 |
| 6,348,179 B1 * | 2/2002 | Paine et al. | 423/277 |
| 6,824,753 B2 * | 11/2004 | Paine et al. | 423/277 |
| 7,060,237 B1 * | 6/2006 | Paine et al. | 423/277 |

FOREIGN PATENT DOCUMENTS

| | | |
|---|---|---|
| CN | 1539729 A | 10/2004 |
| DE | 4108367 C1 | 8/1992 |
| EP | 0918039 | 5/1999 |
| EP | 1053973 | 5/2000 |
| GB | 874165 | 8/1961 |
| GB | 874166 | 8/1961 |
| GB | 1241206 | 8/1961 |
| JP | 06-040713 | 2/1994 |

\* cited by examiner

*Primary Examiner*—Wayne A. Langel
(74) *Attorney, Agent, or Firm*—Dominick G. Vicari

(57) ABSTRACT

A process for producing boron nitride of high purity and high thermal conductivity, wherein a oxygen-containing boron compound is reacted with a nitrogen-containing source in the presence of a dopant at a temperature of at least 1000° C. for at least one hour, and wherein the dopant forms metal borate impurities with a vaporizing temperature that is lower than the highest processing temperature in the process.

24 Claims, No Drawings

PROCESS FOR PRODUCING BORON NITRIDE

CROSS-REFERENCE TO RELATED APPLICATIONS

This application claims the benefits of U.S. 60/639,714 filed Dec. 28, 2004, which patent application is fully incorporated herein by reference.

FIELD OF THE INVENTION

The invention relates generally to a process for producing hexagonal boron nitride using a dopant material for a high purity boron nitride product.

BACKGROUND OF THE INVENTION

Boron nitride is a thermally stable, highly refractory material of increasing commercial significance. Typically, boron nitride is produced by processes wherein boric acid is utilized as the boron source of reaction compositions. Suggested processes for producing boron nitride from boric acid are described in U.S. Pat. Nos. 2,922,699; 3,241,918; and 3,261,667 as well as in British Pat. Nos. 874,166; 874,165; and 1,241,206. JP Patent Publication No. 06-040713 discloses a process for producing boron nitride from colemanite.

In these prior art processes for making boron nitride, borate starting material containing alkali/alkali earth metal compounds—particularly sodium and calcium compounds—when purged with ammonia at temperatures of 1200° C. or higher, form boron nitride plus by-products that require additional washing/treatments steps to recover boron nitride of high purity. Some of the by-products are various forms of calcium borate, which are removed from the boron nitride by leaching with hydrochloric acid. Others processes use a de-ionized water wash to purify the boron nitride. U.S. Pat. No. 3,415,625 discloses a continuous or batch process for a boron nitride product of high purity after a washing/treatment step.

U.S. Pat. No. 4,045,186 discloses the use of $Li_3N$ to react with small particle-sized boron nitride for the subsequent recrystallization of larger-sized crystalline hexagonal boron nitride from the mixture at elevated temperatures of greater than 1100° C. China Patent Publication No. CN1539729A discloses a process for preparing boron nitride from boron trifluoride ether and lithium nitride by solvent heat synthesis method. German Patent Publication No. DE4108367C1 discloses a process to prepare boron nitride with mainly a hexagonal structure that is comprised of reacting a suspension of lithium nitride (in anhydrous di(2-6C)alkyl ether) with an excess of trifluoroborane di(1-6C) alkyl etherate (pref. dibutyl etherate) with stirring, at 20-230° C. for 2-24 hours.

In addition to the washing requirement and before the washing step, the prior art processes typically require a two-step approach to make boron nitride crystals. The first step is a calcination step, wherein the reactants are heated to a temperature of up to 1100° C., forming an incompletely reacted boron nitride in the "turbostratic" form. In the second sintering step, the turbostratic boron nitride is heated to a temperature of 1500 to 2300° C. to control the crystallinity and purity of the final boron nitride product.

The invention relates to a process for preparing boron nitride of high purity and good yield. Additionally, in the process of the invention, the calcination and sintering steps are combined into one single firing step, wherein the metal borate impurities vaporize away forming high purity boron nitride crystals. Lastly, the invention relates to an improved process wherein the washing/leaching of the reaction product is optional for a boron nitride of high purity.

SUMMARY OF THE INVENTION

The invention relates to a process for producing a polycrystalline hexagonal boron nitride (hBN) compound of high purity and high thermal conductivity by reacting an oxygen-containing boron compound with a nitrogen-containing source in the presence of a dopant at a temperature of at least 1000° C. for at least one hour, wherein the dopant is a metal-containing compound that forms a metal borate with a vaporizing temperature that is lower than the highest processing temperature.

The invention further relates to a process for producing a hexagonal boron nitride compound in the presence of lithium nitrate as a dopant.

Lastly, the invention relates to a process for producing a hexagonal boron nitride compound in the presence of lithium nitrate as a dopant, and wherein the processing temperature ranges from 1000 to 2300° C.

DESCRIPTION OF THE INVENTION

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

The term "processing temperature" may be used interchangeably with the term "process temperature," which refers to the temperature in the equipment/step in the process for making hBN in the invention.

The term "highest processing temperature" or "highest process temperature" refers to the highest process temperature as measured in the steps and/or equipment used in the process of making hBN in the invention.

As used herein, thermal conductivity of the boron nitride refers to the thermal conductivity of a sample prepared from a mixture of 40 vol. % hBN (approximately 60 wt. %) in Sylgard 184 silicone resin and Sylgard 184 curing agent, both commercially available from Dow Corning Corp, using a commercially available Hot Disk constant thermal analyzer. An illustrative example is a mixture of 10.0 g of BN material in 6.24 g Sylgard 184 silicone resin and 0.62 g of Sylgard 184 curing agent. After mixing, the samples are allowed to cure and sample pads are prepared, and the thermal conductivity is measured. The Gage R&R data for testing thermal conductivity has shown that these results are accurate within +/−0.5 W/mK.

Raw Materials for use in the Process of the Invention. Generally in processes to produce boron nitride, a boron source and a nitrogen source are used as starting materials, reacting to form a compound in which a boron atom and a nitrogen atom coexist. The present invention relates to a process to produce high purity boron nitride, wherein a dopant is mixed with the starting materials of an oxygen-containing boron compound and an organic nitrogen-containing compound in a reaction at an elevated temperature. The metal borate formed during the reaction from the dopant metal is vaporized, and therefore not required to be leached or washed out.

In one embodiment of the invention, the oxygen-containing boron compound is selected from the group of boric acid, boron oxide, boric oxide providing substances such as boron trioxide, diboron dioxide, tetraboron trioxide or tetraboron pentoxide, and borate ores such as colemanite, ulexite, pandermite, danburite, datolite, and mixtures thereof. In one embodiment of the invention, the oxygen-containing boron compound comprises 50 wt. % boric acid and 50 wt. % ulexite. In another embodiment of the invention, boric acid is used as the oxygen-containing boron compound.

In one embodiment of the invention, the nitrogen-containing compound comprises organic primary, secondary and tertiary amines such as diphenylamine, dicyandiamide, ethylene amine, hexamethylene amine, melamine, urea, and mixtures thereof. In one embodiment, melamine is used as the nitrogen-containing compound.

The dopant for mixing with the starting materials is selected from compounds that form metal borates with a vaporizing temperature that is lower than the highest processing temperature. Examples of such metal-containing compounds include barium compounds such as barium oxide; cesium compounds such as cesium oxide; potassium compounds such as potassium hydroxide; strontium compounds such as strontium oxide; rubidium compounds such as rubidium oxide; and lithium compounds such as lithium oxide, lithium nitrate, lithium acetylacetonate, lithium cyclopentadienide, dilithium phthalocyanine, dilithium salt, lithium acetate, lithium acetylacetonate, lithium amide, lithium bis(trimethylsilyl)amide, lithium tetrahydri doborate, lithium carbonate, lithium dimethylamide, lithium hydride, lithium hydroxide, lithium metaborate, lithium molybdate, lithium niobate, lithium perchlorate, lithium peroxide, lithium tetraborate, lithium borohydride, lithium triethylhydridoborate, and lithium oxalate; and mixtures thereof.

In one embodiment, lithium nitrate is used as the dopant material for the starting mixture, forming borate compounds that evaporate at temperatures below the highest processing temperature of 1800° C., making the final washing/leaching step to remove impurities from the boron nitride reaction product to be an optional step.

In one embodiment, the starting material comprises from 30 to 55 wt. % boric acid, 40 to 50 wt. % melamine, and 1 to 5 wt. % of lithium containing dopant material. In another embodiment, the starting material comprises 52.5 wt. % boric acid, 44.5 wt. % melamine, and 3 wt. % lithium nitrate.

Process Steps: The process for making hBN of the invention may be carried out as a batch process, or as a continuous process, including the following process steps.

Mixing/blending. In the initial step, the starting materials including the dopant are mixed or otherwise blended together in a dry state in suitable equipment such as a blender.

Optional pre-heating/drying step: In one embodiment of the invention and after the mixing/blending step, the starting material is dried at temperatures of about 100 to 400° C. from 0.5 to 15 hours to drive off any moisture in the reactants and create porosity between the raw materials, forming aggregates of materials in the form of nuggets, chunks, or pellets.

In one embodiment, the drying is carried out at a temperature from 150 to 250° C. The drying operation can be carried out in air, or in a nitrogen or ammonia atmosphere. The drying time depends on the drying temperature and also whether the drying step is performed in a static atmosphere, or with circulating air or gas. In one embodiment, the drying time ranges from 4 hours at 200° C. to 15 hours at 150° C. in a static environment. In yet another embodiment, the starting material is dried at 250° C. for 3 hours.

In one embodiment, the reactants and the dopant are contained in a vessel/capsule, and placed into a high temperature furnace (a pusher type furnace or a rotating kiln) up to 1000° C. for up to 2 hours. In this preheat step, the evolution of the gases is controlled by a counter-flow of nitrogen directing the evolved gases toward the furnace entrance.

Optional Crushing of the Precursors: In one embodiment, after the mixing/blending step or after the drying step, the starting raw materials are crushed or broken into small pieces that can be later densified, using conventional equipment such as roller mills, cross beater mills, rolling discs and the like. In one embodiment, the crushed materials are broken into pieces weighing between 10 mg to 10 g each. In yet another embodiment, the materials are broken into pieces weighing about 0.2 g each.

Optionally after the crushing step and when the boron source is an alkali or alkali earth metal borate compound such as ulexite, the crushed material is mixed with silica. The calcium in the ulexite reacts with the silica to produce calcium silicate, limiting the formation of $3CaO.B_2O_3$, which may otherwise be formed, thus giving a high yield of BN in the final reaction. In one embodiment, the total amount of silica to ulexite is maintained at a molar ratio of $SiO_2/CaO$ of less than 0.5. In a second embodiment, the molar ratio is maintained at a rate of less than 1.0.

Optional Preheating and Densification ("Pilling") Step: In one embodiment after the mixing/blending step, the mixed precursors are dried/crushed and densified using a process known in the art such as tableting, briquetting, extruding, pilling, and compacting, among others. In this step, the crushed mixture is densified into pellets weighing from 0.1 g to 200 g each. In one embodiment, the pellets have an average weight of ~10 g. In a second embodiment, the crushed mixture is densified into pellets with an average weight of about 2 g.

In one embodiment, the densification/pelletizing steps are carried out in one extruding step, wherein the raw materials including the dopant and optional silica are fed in a twin screw extruder or similar equipment with a binder, such as polyvinyl alcohol; polyoxyethylene-based nonionic surfactants; polycarboxylic acid salts such as acrylic acid, methacrylic acid, itaconic acid, boletic acid, and maleic acid; polyoxazolines such as poly(2-ethyl-2-oxazoline); stearic acid; N,N'-ethylenebisstearamide; sorbitan compounds such as sorbitan monostearate; and the like. The material is then subsequently dried and pelletized upon exit from the extruder.

The exit pellets can be fed in a continuous process directly into the reaction vessel for the next step, or in yet another embodiment, processed through a furnace of 200° C. for additional drying prior to being fed into the reaction vessel, wherein the high-purity boron nitride of the invention is formed.

Combined Calcination and Heat Treatment Step: In the next step, the pellets are fired in a nitrogenous atmosphere in a reaction chamber, wherein the chamber is heated up from room temperature at a rate of 20 to 1200° C. per hour to at an elevated temperature of 1200 to 2300° C. The process temperature is then held for about 1 to 30 hours, wherein the nitrogen purge is maintained at a rate sufficient to sustain a non-oxidizing environment.

In one embodiment, the pellets are maintained in ammonia while being fired to 1200 to 1600° C. for 2 to 12 hours.

In a second embodiment, the pellets are fired at 1400° C. for about 4 hours. In a third embodiment, the pellets are fired to a temperature of 1800° C. from room temperature at a rate of 500° C. per hour. The temperature is then held at 1800° C. for 5 hours, wherein a nitrogen purge is maintained.

In yet another embodiment, the reaction is carried out at a process temperature in excess of 2000° C. to achieve a high reaction rate, using for example, a plasma jet furnace. In yet another embodiment, the nitrogenous atmosphere is a mixture of ammonia and an inert gas.

The steps described above can be carried out as a batch process whereby the loose pellets are introduced into a reaction chamber for firing. In another embodiment, the steps are carried out as part of a continuous process, wherein the pellets are continuously fed into a reaction vessel. In one embodiment of a continuous process, the reaction vessel is passed through the furnace assembly by a force feed mechanism wherein as each vessel container is introduced into the furnace assembly, each previous vessel container is moved one container length through the furnace.

It should be noted that in the process of the invention, the pellets containing the reactants and dopants are fired in one single step at an elevated processing temperature forming BN crystals, as opposed to the prior art processes wherein a two-step process is required.

The final product of the single combined calcination and heat treatment step herein (as opposed to the 2 steps of the prior art) is a high crystallinity product with a high purity of at least 99% boron nitride. In one embodiment, the BN product has a purity of at least 99.5% purity.

As used herein, a high crystallinity BN product refers to a product of uniform, smooth feel product having a purity of at least 90% boron nitride as well as generally over 99% purity. The degree of crystallinity relates to the degree of smoothness of "feel" during rubbing, as opposed to a rough, chalky feel for poorly crystalline material (as obtained after the 1$^{st}$ step of the 2-step process of the prior art, wherein the turbostratic boron nitride is formed in the calcination step of up to 1100° C.).

Optional Milling Step: Lastly, the reaction product of fired pellets is optionally cooled to temperature before being milled through a jet milling process, into a high purity boron nitride product in the form of platelets between 0.1 to 60 microns in size. In one embodiment the reaction product is milled into powder having an average particle size of 1 to 5 microns. The size is nominal, since each particle is not of such size, but a conglomerate of loosely bonded ultrafine, submicron crystallites.

In yet another embodiment of the invention, the boron nitride powder is crushed and screened to produce agglomerates from 40 mesh to 325 mesh, which materials can be used in thermal applications.

It is noted that the reaction product of the invention is considerably more pure than the boron nitride of the prior art undoped process. As previously indicated, it is suspected that metal borate impurities vaporize away at relatively low temperatures, for a high purity boron nitride product.

Other Optional Post Treatment Steps: As indicated, the boron nitride product of the process of the invention is of high purity Such that acid wash/leaching is not needed. However, in one embodiment of the invention and as an optional step for a boron nitride product of exceptional purity, the product is optionally subject to a washing treatment. In one embodiment, the final BN product is washed with a solvent such as methanol or a 1% aqueous solution of nitric acid, to produce a fine, white, high purity crystalline boron nitride powder.

In another embodiment of the invention, the BN product of the invention is further heat-treated or sintered at 1700 to 2100° C. in a non-oxidizing gas atmosphere such as nitrogen, ammonia, or argon. This treatment results in the progress of crystallization, for a BN product of improved crystallinity and purity and a thermal conductivity of at least 0.3 W/mK. In one embodiment of the invention, the BN powder has a thermal conductivity in the range of 3 to 15 W/mK.

Applications of the BN Powder Made from the Invention: The high purity boron nitride powder of the present invention can be used as a filler for thermal management applications, such as in composites, polymers, greases, and fluids. The boron nitride powder can also be used in hot pressing applications, or as a precursor feed stock material in the conversion of hexagonal boron nitride to cubic boron nitride. In another embodiment, the material is used for making a hexagonal boron nitride paste. As used herein, paste is a semisolid preparation. This method involves providing a boron nitride slurry and treating the slurry under conditions effective to produce a boron nitride paste including from about 60 wt. % to about 80 wt. % solid hexagonal boron nitride.

In thermal management applications, e.g., thermal conductivity sheets, the boron nitride of the invention is used as a filler in a matrix comprising at least one selected from among thermoplastic resins such as polyethylene, polypropylene, polystyrene, poly-p-xylene, polyvinyl acetate, polyacrylate, polymethyl methacrylate, polyvinyl chloride, polyvinylidene chloride, fluorine-base plastic, polyvinyl ether, polyvinyl ketone, polyether, polycarbonate, thermoplastic polyester, polyamide, diene base plastic, polyurethane-base plastic, silicone and inorganic plastic; and thermosetting resins such as a phenol resin, furan resin, xylene/formaldehyde resin, ketone/formaldehyde resin, urea resin, melamine resin, aniline resin, alkyd resin, unsaturated polyester resin and epoxy resin.

In one embodiment of a thermal management application, the boron nitride of the invention is used as a filler for a matrix comprising up to 60 wt. % of a composite selected from the group of silicone, epoxy, acrylic, vinyl chloride, polyurethane, and mixtures thereof, for a thermal conductivity of at least 0.50 W/m·K.

In thermal management applications, it is found that the dopants help increase the thermal conductivity of the boron nitride product. In embodiments wherein $LiNO_3$ is used as the dopant or seed material for making the hBN of the invention, the thermal conductivity of the samples employing the BN of the invention is much higher than the thermal conductivity of samples employing BN made using the undoped process of the prior art.

EXAMPLES 1-4: Four samples are made containing melamine and boric acid in a weight ratio of 23:27. Example 1 contains only melamine and boric acid; example 2 contains an additional amount of 1.5 wt % lithium nitrate; example 3 has 3.0 wt. % lithium nitrate; and example 4 has 5.0 wt. % lithium nitrate. All of samples are dried at 275° C. overnight. The dried material is then pressed into cylindrical pills and fired in nitrogen at a rate of 500° C. per hour from room temperature to 1800° C. and held for 3 hours. The pills prepared from the four examples are weighed and milled with a ball mill to be analyzed. Samples pads are made and measured for thermal conductivity.

The results for thermal conductivity ("TC") and total yields computed for the examples are given in the table below.

TABLE

|  | Example 1 | Example 2 | Example 3 | Example 4 |
|---|---|---|---|---|
| % dopant | 0.0% | 1.5% | 3.0% | 5.0% |
| TC (W/mK) | 1.8 | 1.5 | 7.2 | 7.1 |
| Yield (%) | 19.3 | 20.0 | 19.9 | 18.2 |

The boron nitride products prepared from the process of the invention show higher thermal conductivity than the product of the prior art, i.e., having a thermal conductivity of at least 1.5 W/mK. Thermal conductivity, in a way, can be used as an indication of the purity of the boron nitride (BN) substance. If the BN product contains impurities such as borate compounds or oxygen, the thermal conductivity will be hindered.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

All citations referred herein are expressly incorporated herein by reference.

The invention claimed is:

1. A process for producing hexagonal boron nitride compound, which comprises:
reacting in a reaction zone an oxygen-containing boron compound with a nitrogen-containing source in the presence of one or more compounds used as dopants at a processing temperature of at least 1000° C. for at least one hour to form a hexagonal boron nitride compound, wherein the dopants are metal compounds that form metal borates with a vaporizing temperature that is lower than the processing temperature, wherein the oxygen-containing boron compound is introduced into the reaction zone as a solid.

2. The process of claim 1, wherein the hexagonal boron nitride compound displays a thermal conductivity of at least 1.5 W/mK.

3. The process of claim 1, wherein the hexagonal boron nitride compound displays a thermal conductivity of at least 3 W/mK.

4. The process of claim 1, wherein the hexagonal boron nitride compound displays a thermal conductivity of at least 5 W/mK.

5. The process of claim 1, wherein the oxygen-containing boron compound reacts with the nitrogen-containing source in the presence of the dopant at a processing temperature ranging from 1000 to 2300° C.

6. The process of claim 5, wherein the processing temperature is at least 1850° C. and the hexagonal boron nitride compound has a final purity as produced of at least 95%.

7. The process of claim 6, wherein the processing temperature is at least 2000° C. and the hexagonal boron nitride compound has a final purity as produced of at least 99%.

8. The process of claim 5, wherein the oxygen-containing boron compound reacts with the nitrogen-containing source in the presence of the dopant at a processing temperature ranging from 1000 to 2300° C., and for a period of up to 72 hours.

9. The process of claim 8, wherein the reaction is carried out for a period of up to 30 hours.

10. The process of claim 9, wherein the reaction is carried out for a period of up to 12 hours.

11. The process of claim 10, wherein the reaction is carried out for a period of up to 6 hours.

12. The process of claim 1, wherein the dopant comprises at least one compound selected from the group consisting of barium compounds, cesium compounds, potassium compounds, strontium compounds, rubidium compounds, lithium nitrate, lithium oxide, lithium acetylacetonate, lithium cyclopentadienide, dilithium phthalocyanine, dilithium salt, lithium acetate, lithium acetylacetonate, lithium amide, lithium bis(trimethylsilyl)amide, lithium tetrahydridoborate, lithium carbonate, lithium dimethylamide, lithium hydride, lithium hydroxide, lithium metaborate, lithium molybdate, lithium niobate, lithium perchlorate, lithium peroxide, lithium tetraborate, lithium borohydride, lithium triethylhydridoborate, lithium oxalate, and mixtures thereof.

13. The process of claim 12, wherein the dopant comprises at least one compound selected from the group consisting of barium oxide, barium nitrate, cesium oxide, cesium nitrate, potassium hydroxide, strontium oxide, strontium nitrate, rubidium oxide, rubidium nitride, lithium nitrate, lithium oxide, lithium acetylacetonate, lithium cyclopentadienide, dilithium phthalocyanine, dilithium salt, lithium acetate, lithium acetylacetonate, lithium amide, lithium bis(trimethylsilyl)amide, lithium tetrahydridoborate, lithium carbonate, lithium dimethylamide, lithium hydride, lithium hydroxide, lithium metaborate, lithium molybdate, lithium niobate, lithium perchlorate, lithium peroxide, lithium tetraborate, lithium borohydride, lithium triethylbydridoborate, lithium oxalate, and mixtures thereof.

14. The process of claim 12, wherein the dopant is present in an amount of at least 1 wt. % of the total weight of the oxygen-containing boron compound and the nitrogen-containing source.

15. The process of claim 12, wherein the dopant is selected from the group consisting of barium oxide, cesium oxide, potassium hydroxide, strontium oxide, rubidium oxide, lithium nitrate, and mixtures thereof.

16. The process of claim 13, wherein the dopant is lithium nitrate, and wherein the amount of dopant present is at least 1 wt. % of the total weight of the oxygen-containing boron compound and the nitrogen-containing source.

17. The process of claim 16, wherein the dopant is lithium nitrate, and wherein the amount of dopant present is at least 2 wt. % of the total weight of the oxygen-containing boron compound and the nitrogen-containing source.

18. The process of claim 13, wherein the dopant comprises at least one compound selected from the group consisting of lithium nitrate, lithium oxide, lithium acetylacetonate, lithium cyclopentadienide, dilithium phthalocyanine, dilithium salt, lithium acetate, lithium acetylacetonate, lithium amide, lithium bis(trimethylsilyl)amide, lithium tetrahydridoborate, lithium carbonate, lithium dimethylamide, lithium hydride, lithium hydroxide, lithium metaborate, lithium molybdate, lithium niobate, lithium perchlorate, lithium peroxide, lithium tetraborate, lithium borohydride, lithium triethylhydridoborate, lithium oxalate, and mixtures thereof.

19. The process of claim 18, wherein the dopant comprises at least one compound selected from the group consisting of lithium nitrate, lithium oxide, lithium carbonate, lithium hydride, lithium hydroxide, lithium metaborate, lithium peroxide, lithium tetraborate, lithium borohydride, and mixtures thereof.

20. The process of claim 19, wherein the dopant is lithium nitrate.

21. The process of claim 1, wherein said process is a continuous process.

22. A process for producing hexagonal boron nitride compound, which process comprising the steps of:
   a) forming a mixture of an oxygen-containing boron compound, a nitrogen-containing source, and a dopant, the dopant being present at an amount of at least 1 wt. % of the total weight of the oxygen-containing boron compound and the nitrogen-containing source, wherein the mixture comprises only solids;
   b) heating the mixture at a temperature of at least 200° C. for at least ½ hour to dry off any moisture in the mixture;
   c) subjecting the mixture to a processing temperature of at least 1200° C. for at least one hour to form a hexagonal boron nitride compound;
   wherein the dopant is a metal compound that forms a metal borate with a vaporizing temperature that is lower than the processing temperature.

23. The process of claim 22, wherein the processing temperature is at least 2000° C. and the product as formed has a purity of at least 99% boron nitride.

24. A process of for producing hexagonal boron nitride compound, comprising:
   a) forming a mixture of an oxygen-containing boron compound, a nitrogen-containing source, and a dopant, the dopant being present at an amount of at least 1 wt. % of the total weight of the oxygen-containing boron compound and the nitrogen-containing source, wherein the mixture comprises only solids:
   b) subjecting the mixture to a processing temperature of at least 2000° C. for at least one hour to form a hexagonal boron nitride compound:
   wherein the dopant is a metal compound that forms a metal borate with a vaporizing temperature that is lower than the processing temperature.

* * * * *